US009772042B2

(12) United States Patent
Boisvert et al.

(10) Patent No.: US 9,772,042 B2
(45) Date of Patent: Sep. 26, 2017

(54) FLUID FLOW CONTROL DEVICES AND SYSTEMS

(71) Applicant: Honeywell International Inc., Morristown, NJ (US)

(72) Inventors: David Ronald Boisvert, North Chelmsford, MA (US); Joseph Mello, Waltham, MA (US); Lloyd Nghi Trong Le, Braintree, MA (US)

(73) Assignee: Honeywell International Inc., Morris Plains, NJ (US)

( * ) Notice: Subject to any disclaimer, the term of this patent is extended or adjusted under 35 U.S.C. 154(b) by 507 days.

(21) Appl. No.: 14/334,267

(22) Filed: Jul. 17, 2014

(65) Prior Publication Data

US 2016/0010752 A1    Jan. 14, 2016

Related U.S. Application Data

(60) Provisional application No. 62/022,851, filed on Jul. 10, 2014.

(51) Int. Cl.
*F16K 17/30* (2006.01)
*G05D 7/01* (2006.01)

(52) U.S. Cl.
CPC ............ *F16K 17/30* (2013.01); *G05D 7/0133* (2013.01)

(58) Field of Classification Search
CPC ................ F16K 17/30; Y10T 137/3367; Y10T 137/3421; Y10T 137/7793–137/7831;
(Continued)

(56) References Cited

U.S. PATENT DOCUMENTS 2,487,520 A * 11/1949 Brown ................ F16H 61/4043
137/115.13
2,925,826 A    2/1960 Streeter
(Continued)

FOREIGN PATENT DOCUMENTS

WO      9718419 A1    5/1997

OTHER PUBLICATIONS

Extended Search Report from related EP Patent Application 15174709, dated May 23, 2016, 7 pages.
(Continued)

*Primary Examiner* — Craig Schneider
*Assistant Examiner* — Frederick D Soski
(74) *Attorney, Agent, or Firm* — Brooks, Cameron & Huebsch, PLLC

(57) ABSTRACT

Devices and systems which control the flow of fluid through a conduit are described herein. One flow control device that controls the flow of fluid through a conduit, includes a body having an axis and defining a passage that allows fluid to flow from an upstream position to a downstream position, the valve body having a converging portion in the upstream position with an inner surface that curves gradually inward, but having an annular rim formed by a portion that extends outward from the inward curving shape, and a throat between the converging and diverging portions; and, a flow regulator supported within the body for controlling the flow of fluid through the conduit, the flow regulator having an annular seating surface configured to contact the annular rim of the body.

19 Claims, 3 Drawing Sheets

(58) Field of Classification Search
CPC ......... Y10T 137/7835; Y10T 137/7869; Y10T 137/7815
See application file for complete search history.

(56) References Cited

U.S. PATENT DOCUMENTS

| | | | | |
|---|---|---|---|---|
| 3,106,226 | A * | 10/1963 | Machen | G05D 7/0133 137/517 |
| 3,240,223 | A | 3/1966 | Vander Horst | |
| 3,255,963 | A * | 6/1966 | Gorchev | F24F 11/047 138/46 |
| 3,489,165 | A * | 1/1970 | Salerno | F16K 1/126 137/220 |
| 3,559,676 | A | 2/1971 | Haskins | |
| 3,763,884 | A * | 10/1973 | Grassi | F24F 11/047 137/504 |
| 4,009,826 | A * | 3/1977 | Walker | G05D 7/0126 137/504 |
| 4,770,212 | A | 9/1988 | Wienck | |
| 5,105,850 | A * | 4/1992 | Harris | F16K 17/34 137/513.3 |
| 5,116,107 | A * | 5/1992 | Hull | B60T 13/263 303/40 |
| 6,311,812 | B1 | 11/2001 | Sonsterod | |
| 2005/0199288 | A1* | 9/2005 | Scholten | B08B 15/023 137/517 |
| 2011/0284104 | A1* | 11/2011 | Riano Gutierrez | G05D 7/0133 137/517 |

OTHER PUBLICATIONS

Gold Valve Cartridge Emulators. Retrieved from: http://www.racetech.com/page/title/Emulators.

* cited by examiner

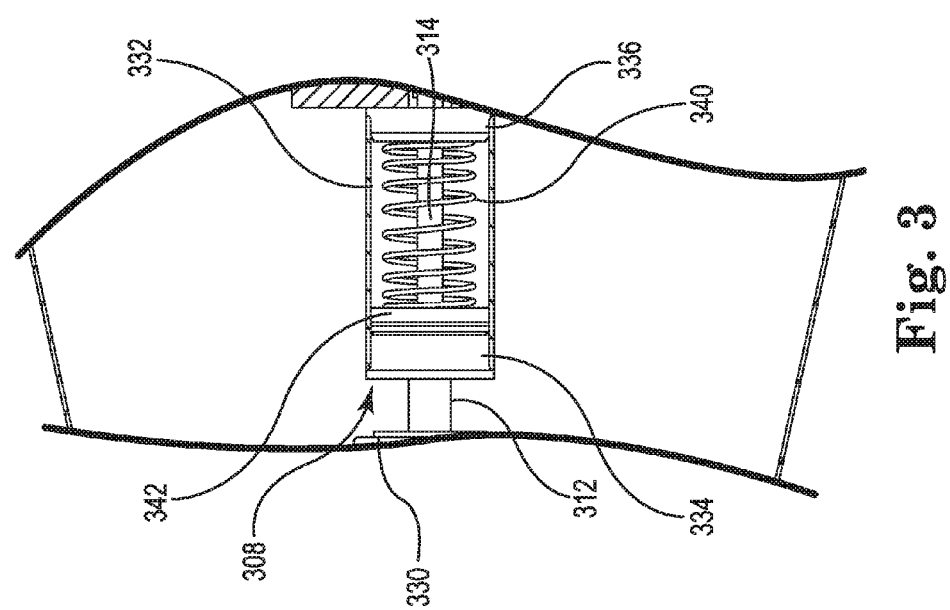

FLUID FLOW CONTROL DEVICES AND SYSTEMS

CROSS-REFERENCE TO RELATED APPLICATION(S)

The present application claims the benefit of U.S. Application No. 62/022,851, filed Jul. 10, 2014.

TECHNICAL FIELD

The present disclosure relates to a fluid flow control devices and systems.

BACKGROUND

When using conventional fluid flow control devices near minimum flow or shutoff, a number of factors including: duct configuration, turbulence, leakage, etc., can cause the internal mechanism to become unstable. This can result in inaccurate fluid flow through the device.

In some instances, the rate of fluid flow through the device can change drastically as the regulator closes the valve. Additionally, the internal mechanism can produce undesirable sounds and flexing of the duct which could result in damage to the valve and/or duct that would result in leakage or incorrect flows.

BRIEF DESCRIPTION OF THE DRAWINGS

FIG. 3 is partial cutaway view of a damping mechanism of an embodiment of the present disclosure.

DETAILED DESCRIPTION

Figure 1:
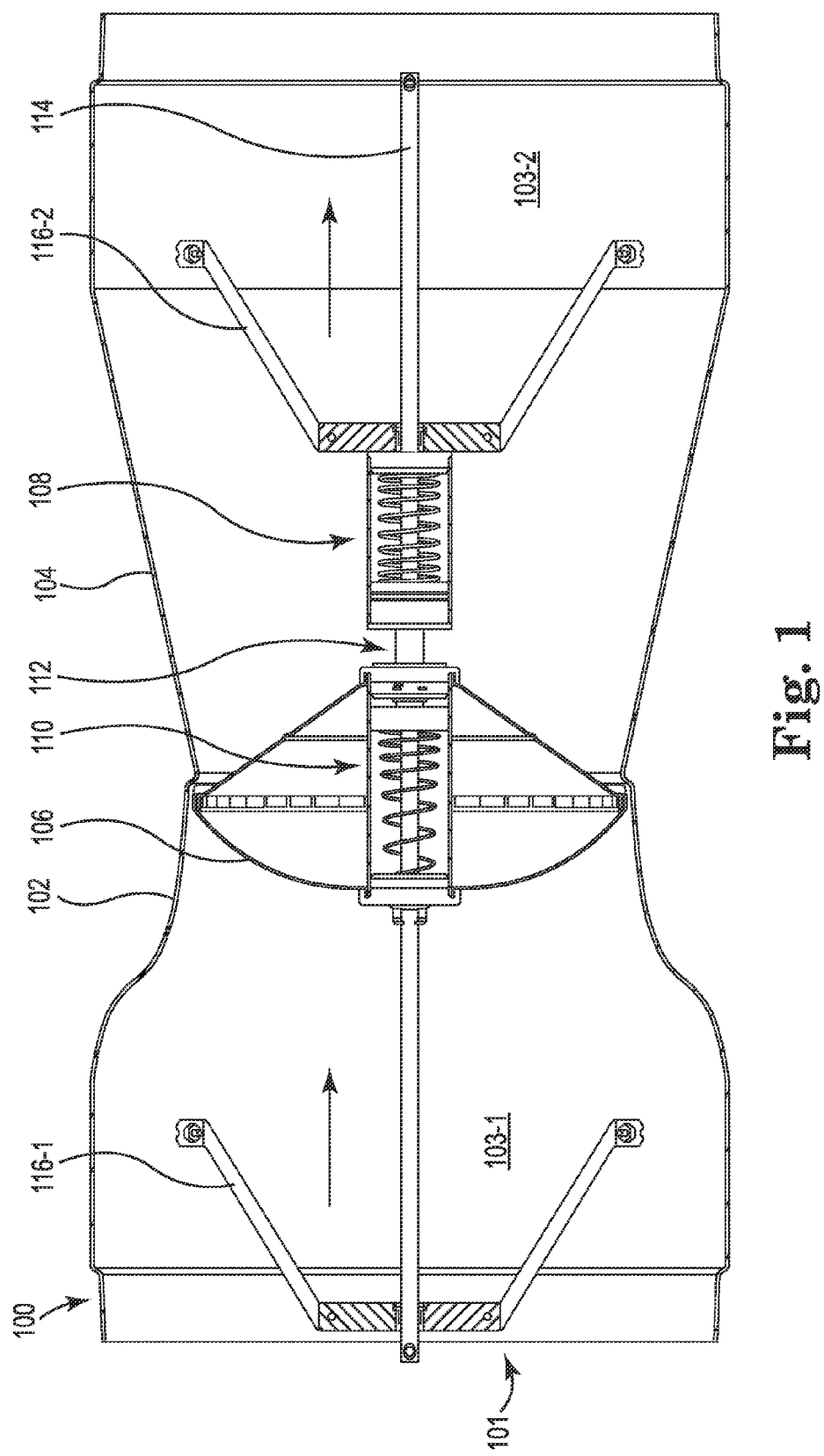
FIG. 1 is a cutaway view of a fluid flow valve embodiment of the present disclosure.

The present disclosure relates to fluid flow control devices and systems, for example, to reduce or alleviate instability that are described herein. The embodiments of the present disclosure can be utilized to control the fluid flow through the conduit, particularly when the device is in a nearly closed condition or is just starting to open.

Embodiments of the present disclosure provide a damping mechanism that allows the valve to close without becoming unstable which may lead to the fluid flow being inconsistent, the regulator abruptly stopping and starting, and/or the regulator banging on the side of the conduit or a stopping surface thereon, among other benefits. An embodiment of the present disclosure is provided in FIGS. 1-3 and discussed herein.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be reference by 208 in FIG. 2. As used herein, "a" or "an" refer to one or more. For example, "an element" can refer to one or more element.

FIG. 1 is a cutaway view of a fluid flow valve embodiment of the present disclosure. In the embodiment of FIG. 1, the flow control device 100 controls the flow of fluid through a conduit 101. As used herein, the term "valve" generally refers to the flow control device. Further, as used herein, the term "conduit" describes a housing having a passage for the flow of a fluid through the conduit (e.g., the fluid enters the conduit at a first end and exits the conduit at a second end.

The device 100 is typically attached in a duct or piping system where the conduit 101 is connected to a portion of the duct or piping at a first end and fluid flows from the pipe or duct into the conduit 101. In such an arrangement, the conduit 101 is also connected to the duct or piping at the second end and the flow of fluid exits the conduit 101 and continues flowing in the pipe or duct system.

The device 100 includes a conduit body having an axis (along which the shaft 114 is axially aligned) and defining a passage that allows fluid to flow from an upstream position 103-1 to a downstream position 103-2 (illustrated by the straight arrows in the upstream position and the downstream position). The body has a converging portion 102 in the upstream position with an inner surface that curves gradually inward and a diverging portion 104 wherein the sides (in the example of FIG. 1, the conduit has a circular cross-section and, therefore, has only one continuous side, however, the shape of the conduit can differ in various embodiments and may have more than one side) of the conduit 101 expand outward from the axis. The transition between the converging and diverging portions is referred to herein as the throat.

A flow regulator 106 is supported within the conduit for controlling the flow of fluid through the conduit 101. The shaft 114 is provided onto which a flow regulator 106 is mounted. In the embodiment of FIG. 1, the shaft 114 passes through the passage of the conduit 101 and through the body of the flow regulator 106. The shaft 114 is axially movable by a control mechanism (not shown). In this manner the regulator can be automatically or manually positioned (e.g., electrically, mechanically, or pneumatically) in one or more upstream initial positions that are closer or further away from the upstream end of the conduit.

A resilient mechanism 110 within the flow regulator 106 may be mounted on the shaft 114 to bias the flow regulator 106 toward a pre-determined position. The resilient mechanism 110 allows for the flow regulator 106 to move axially with respect to the shaft 114 in response to fluid flow variations such that a substantially constant volume of fluid will pass through the passageway of the body. In this manner, the resilient mechanism in the flow regulator body can be configured to reduce or eliminate oscillations of the flow regulator as an annular seating surface of the regulator approaches an annular rim of the conduit, as will be discussed in more detail below.

With respect to the conduit 101, constant volume control may be provided by the axial movement of the regulator 106. The regulator is mounted on an assembly that includes the shaft 114, support members 116-1 and 116-2 that maintain the shaft in an axial orientation and allow the shaft to slide in an axial direction. The regulator 106 is mounted on the shaft 114 and has a smoothly increasing contour along its upstream side.

The largest diameter of the regulator is positioned proximate to the converging portion of the conduit to create an annular orifice. The regulator 106 moves axially on the shaft to increase or decrease the orifice area of the passage between the regulator and the side of the conduit.

The resilient mechanism 110 biases the regulator 106 in an axial position against a resilient mechanism stop position (i.e., wherein the resilient mechanism is fully compressed and cannot compress any further) such that when fluid flows through the valve, a pressure force across the valve moves the regulator back and forth to maintain a constant volume flow through the valve.

Thus, when the pressure drop across the valve increases, the regulator is pushed further toward the throat of the valve to reduce the area of the orifice and thus attempt to maintain a constant volume of fluid flowing though the valve. Similarly, when the pressure drop decreases the regulator moves away from the throat and the orifice opens to attempt to maintain a constant volume of fluid flow.

As discussed above, in some embodiments, the shaft 114 is axially movable by an actuator so that the flow volume may be adjusted automatically by electronic control, for example. Typically, operating requirements of the fluid control system may make changing the volume flow desirable. For example, in a laboratory fluid control system, discussed in detail below, raising a fume hood sash will typically require a shaft adjustment so that more fluid will flow through the valve to provide a relatively constant face velocity across the sash opening.

The diverging portion 104 of the conduit body preferably has an outwardly tapered configuration that begins at the throat and extends until the diameter of the surface extends to the nominal diameter at the second end of the conduit body. As shown in FIG. 1, the diverging portion is located at a downstream position 103-2 of the conduit 101. Although a frusto-conical configuration is illustrated, other shapes would also be suitable such as a square, a rectangle or an oval, as would be apparent to those skilled in the art.

The assembly also includes a second resilient mechanism 108 that is spaced from the regulator 106 by a spacer 112. This resilient mechanism can be utilized to damp the movement of the regulator as the regulator approaches a fully closed configuration, wherein the passage between the regulator and the conduit allows little to no flow through the passage, such as is shown in FIG. 1.

The resilient mechanism can also be utilized, in some embodiments, to damp the movement of the regulator as the regulator launches from a fully closed configuration to a more open configuration, wherein the passage between the regulator and the conduit begins to allow more flow through the passage. This can make the flow more consistent as it transitions from closed to open.

Figure 2:
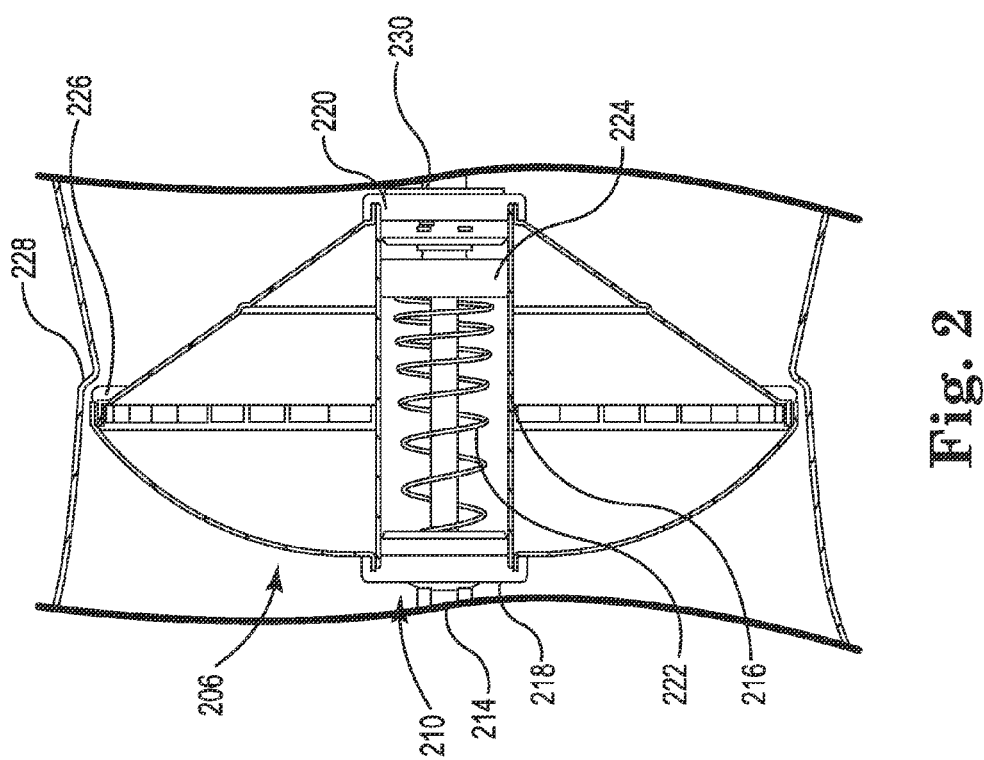
FIG. 2 is partial cutaway view of a fluid flow regulator of an embodiment of the present disclosure.

FIG. 2 is partial cutaway view of a fluid flow regulator of an embodiment of the present disclosure. FIG. 2 is an enlarged view of the portion of the conduit of FIG. 1 having the regulator 106. In FIG. 2, the regulator 206 has a resilient mechanism 210 with a number of mechanical parts.

Although shown as a mechanical apparatus, the resilient mechanism can also be made from a resilient material such as rubber, foam, or other such materials that can provide a damping functionality to the flow control device. Additionally, although shown with a spring and piston design, other mechanical mechanisms that provide damping functionality can be utilized with embodiments of the present disclosure. For example, in some embodiments, a pneumatic or electromechanical mechanism can be utilized for either or both of the first and/or second resilient mechanism.

With respect to the embodiment of FIG. 2, the resilient mechanism includes a cylinder 216 having two end caps 218 and 220. The end caps allow the interior space of the cylinder to maintain air or other fluid within the cylinder to provide some damping properties. In some embodiments, the cylinder may not be completely air tight, but may allow air to leak out as the piston is compressed and then allow air to be pulled back in as the piston expands.

In the embodiment of FIG. 2, the shaft 214 passes through a hole in the end cap 218 and is attached to the piston body 224. The piston body has a diameter and circumferential shape to restrict the amount of fluid within the cylinder from pass around the piston body and the side of the cylinder. In such a manner, the piston damps the movement of the regulator 206. The cylinder 210 also includes a resilient portion (e.g., spring 222) therein that biases against the movement of the piston and forces the piston back to a pre-determined initial position within the cylinder when pressure from the fluid within the passage of the conduit is not present or, in some applications, is at a low flow level. In this manner, the regulator can adjust its position based on the amount of fluid pressure in the passage of the conduit.

FIG. 2 also illustrates the annular seating surface 226 of the regulator 206 and the annular rim 228 of the body of the conduit. It is these surfaces that when interacting, can reduce or in some embodiments, shut off the flow of fluid in the passage.

For example, if these surfaces are complementary around their circumference, then the flow can be shut off or nearly shut off depending on how closely they are engaged. If there is some places where they are not complementary (their surfaces do not contact to close the passage completely) between the two surfaces, then some air will be able to pass between them and the flow of fluid will be at a minimum level, but not shut off completely.

In some embodiments, the annular rim is positioned at the transition between the converging and diverging portions. In this manner, the regulator can have a smaller diameter than if the annular rim were positioned at a location farther upstream.

Additionally, FIG. 2 provides an additional end cap 230 that can be used to keep debris out of the cylinder 210 and can interface with the spacer, as will be discussed in more detail below. The end cap 230 can be made from a rigid material, such as metal or plastic, or can be made from a resilient material, such as rubber or foam.

FIG. 3 is partial cutaway view of a damper mechanism of an embodiment of the present disclosure. FIG. 3 is an enlarged view of the portion of the conduit of FIG. 1 having the second resilient mechanism 108 and spacer 112.

In the embodiment of FIG. 3, the second resilient mechanism includes a cylinder 332 having two end caps 334 and 336. As with the first resilient mechanism, the end caps allow the interior space of the cylinder to maintain air or other fluid within the cylinder to provide some damping properties. Also as discussed above, in some embodiments, the cylinder may not be completely air tight, but may allow air to leak out as the piston is compressed and then allow air to be pulled back in as the piston expands.

In the embodiment of FIG. 3, the shaft 314 passes through a hole in the end caps 334 and 336, however, in the mechanism, the shaft 314 is not attached to the piston body 342. Rather, the spacer 312 passes through the end cap 334 and contacts the piston body 342 to move the piston body. The spring 340 provides a biasing force against the force from the spacer to move the piston body 342 to a pre-determined initial position.

As with the first resilient mechanism, the piston body 342 has a diameter and circumferential shape to restrict the amount of fluid within the cylinder to pass around the piston body and the side of the cylinder. In such a manner, the piston damps the movement of the regulator.

However, the second resilient mechanism only damps the movement of the regulator when the spacer is in contact with the regulator as shown in FIG. 1 (e.g., when an engagement surface of the body of the regulator, such as a surface of the end cap 220 or, if used, end cap 330 contacts the spacer 312).

In the embodiment shown in FIG. 1, the spacer is sized such that the interaction between it and the regulator will only occur when the regulator is near its fully closed position. Accordingly, in such embodiments, the second resilient mechanism can be utilized to damp the movement of the regulator as the regulator approaches a fully closed configuration, wherein the passage between the regulator and the conduit allows little to no flow through the passage, such as is shown in FIG. 1.

The second resilient mechanism can also be utilized, in some embodiments, to damp the movement of the regulator as the regulator launches from a fully closed configuration to a more open configuration, wherein the passage between the regulator and the conduit begins to allow more flow through the passage. This can make the flow more consistent as it transitions from closed to open.

Provided below is an example embodiment of the present disclosure. In this embodiment, a flow control device that controls the flow of fluid through a conduit includes a body having a passage that allows fluid to flow from an upstream position to a downstream position. The valve body has a converging portion in an upstream position with an inner surface that curves gradually inward and a throat between the converging portion and a diverging portion in the downstream position. The device also includes a flow regulator supported within the body for controlling the flow of fluid through the conduit the flow regulator, wherein the flow regulator has a body and wherein the body includes a first resilient mechanism configured to reduce or eliminate oscillations of the flow regulator as the flow regulator moves toward the downstream position.

As discussed herein, the inner surface that curves gradually inward, can have an annular rim formed by a portion that extends outward from the inward curving shape and wherein the flow regulator has an annular seating surface configured to contact the annular rim of the body.

In some such embodiments, the first resilient mechanism includes a cylinder having a resilient portion (e.g., a spring, or resilient material such as, rubber or foam, for instance) and a piston body within the cylinder. A resilient mechanism can be mounted on a shaft and the mechanism can be utilized to bias the flow regulator in a predetermined position, the resilient mechanism allowing the flow regulator to move axially with respect to the shaft in response to fluid flow variations through the passage such that a constant volume of fluid may pass through the passage of the valve body. As discussed herein, the device can also include a second resilient mechanism in the passage that is configured to dampen (e.g., retard the movement of) the movement of the flow regulator as the flow regulator moves toward the downstream position.

In some embodiments, the device can include a spacer positioned between the first resilient mechanism and the second resilient mechanism. As discussed, the spacer can be used to space the regulator from the second resilient mechanism. In some embodiments, the spacer passes through one end of the second resilient mechanism and contacts a piston within a cylinder of the second resilient mechanism. The spacer can be positioned between an exterior surface of the flow regulator and the second resilient mechanism.

Similarly with respect to the first resilient mechanism, the second resilient mechanism can include a cylinder having a resilient portion and a piston body within the cylinder.

Provided below is an example embodiment of the present disclosure. In this embodiment, a flow control device that controls the flow of fluid through a conduit includes a conduit body having a passage that allows fluid to flow from an upstream position to a downstream position, the valve body having a converging portion in the upstream position with an inner surface that curves gradually inward, but having an annular rim formed by a portion that extends outward from the inward curving shape, and a throat between the converging and diverging portions. The embodiment also includes a flow regulator supported within the body for controlling the flow of fluid through the conduit the flow regulator, the flow regulator having an annular seating surface configured to contact the annular rim of the body, and wherein the flow regulator has a body and wherein the body includes a first resilient mechanism configured to reduce or eliminate oscillations of the flow regulator as the flow regulator moves toward the downstream position.

In some embodiments, the flow regulator body has a diameter such that the body will not pass through the smallest diameter of the passage. In this manner, the flow through the passage of the conduit can be completely shut off, in some embodiments. As discussed above, in some embodiments, the system can include a second resilient mechanism in the passage that is configured to dampen the movement of the flow regulator as the flow regulator moves toward the downstream position.

Embodiments of the present disclosure can be of any size and/or used in multiple valve combinations (e.g., dual, triple, quad, etc.). In such multiple valve combination embodiments, one or more of the valves can be embodiments of the present disclosure.

The embodiments of the present disclosure are described in sufficient detail to enable those of ordinary skill in the art to practice one or more embodiments of this disclosure. It is to be understood that other embodiments may be utilized and that process and/or structural changes may be made without departing from the scope of the present disclosure.

As will be appreciated, elements shown in some embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

What is claimed:

1. A flow control device that controls the flow of fluid through a conduit, comprising:
    a body having an axis and defining a passage that allows fluid to flow from an upstream position to a downstream position, the valve body having a converging portion in the upstream position and having an annular rim formed between the converging portion and a diverging portion in the downstream position;
    a flow regulator supported within the body for controlling flow of fluid through the conduit, the flow regulator having an annular seating surface configured to contact the annular rim of the body and a first resilient mechanism that biases the flow regulator toward a predetermined position; and
    a second resilient mechanism that is spaced from the flow regulator by a spacer to damp movement of the flow regulator only when the spacer is in contact with the flow regulator.

2. The flow control device of claim 1, wherein the first resilient mechanism is configured to reduce or eliminate oscillations of the flow regulator as the annular seating surface approaches the annular rim.

3. The flow control device of claim 1, wherein the first resilient mechanism includes a cylinder and a piston inside the cylinder, configured to dampen the movement of the flow regulator as the annular seating surface approaches the annular rim.

4. The flow control device of claim 3, wherein the first resilient mechanism includes the cylinder, having a resilient portion and the piston within the cylinder.

5. The flow control device of claim 1, wherein the device has a shaft that passes through the passage and through the body.

6. The flow control device of claim 1, wherein the flow regulator includes a surface of an end cap for engaging the first resilient mechanism configured to reduce or eliminate oscillations of the flow regulator as the annular seating surface approaches the annular rim.

7. A flow control device that controls flow of fluid through a conduit, comprising:
   a valve body having a passage that allows fluid to flow from an upstream position to a downstream position, the valve body having a converging portion in the upstream position and having an annular rim formed between the converging portion and a diverging portion in the downstream position;
   a flow regulator supported within the valve body for controlling the flow of fluid through the conduit, wherein the flow regulator includes a first resilient mechanism that biases the flow regulator toward a pre-determined position; and
   a second resilient mechanism that is spaced from the flow regulator by a spacer to damp movement of the flow regulator only when the spacer is in contact with the flow regulator.

8. The flow control device of claim 7, wherein the first resilient mechanism includes a cylinder having a first resilient portion and a piston body within the cylinder.

9. The flow control device of claim 7, wherein the flow regulator has an annular seating surface configured to contact the annular rim.

10. The flow control device of claim 7, further comprising the first resilient mechanism mounted on a shaft that biases the flow regulator in a predetermined position, the first resilient mechanism allowing the flow regulator to move axially with respect to the shaft in response to fluid flow variations through the passage such that a constant volume of fluid passes through the passage of the valve body.

11. The flow control device of claim 7, wherein the second resilient mechanism is configured to dampen the movement of the flow regulator as the flow regulator moves toward the downstream position.

12. The flow control device of claim 11, wherein the spacer is positioned between the first resilient mechanism and the second resilient mechanism.

13. The flow control device of claim 11, wherein the spacer passes through one end of the second resilient mechanism and contacts a piston body within a cylinder of the second resilient mechanism.

14. The flow control device of claim 7, wherein the spacer is positioned between an exterior surface of the flow regulator and the second resilient mechanism.

15. The flow control device of claim 7, wherein the second resilient mechanism includes a cylinder having a second resilient portion and a piston body within the cylinder.

16. The flow control device of claim 15, wherein a shaft passes through the first resilient mechanism and second resilient mechanism.

17. A flow control system that controls flow of fluid through a conduit, comprising:
   a conduit body having a passage that allows fluid to flow from an upstream position to a downstream position, a valve body having a converging portion in the upstream position and having an annular rim formed between the converging portion and a diverging portion in the downstream position;
   a flow regulator supported within the valve body for controlling the flow of fluid through the conduit of the flow regulator, the flow regulator having an annular seating surface configured to contact the annular rim of the valve body, and wherein the flow regulator includes a first resilient mechanism that biases the flow regulator toward a predetermined position; and
   a second resilient mechanism that is spaced from the flow regulator by a spacer to damp movement of the flow regulator only when the spacer is in contact with the flow regulator.

18. The flow control system of claim 17, wherein the flow regulator body has a diameter such that the regulator body will not pass through the smallest diameter of the passage.

19. The flow control system of claim 17, wherein the second resilient mechanism is configured to dampen the movement of the flow regulator as the flow regulator moves toward the downstream position.

* * * * *